United States Patent Office 3,372,143
Patented Mar. 5, 1968

3,372,143
PROCESS FOR PRODUCING MODIFIED POLY-
ESTERS WITH EPOXY ETHER COMPOUNDS
Hiroshi Terada, Ohtake-shi, Masao Ishii, Tokyo, and
Makoto Yamada, Kazunari Tokuda, Osamu Nakagawa,
Takeshi Imaida, and Shunichi Takashima, Ohtake-shi,
Japan, assignors to Mitsubishi Rayon Co., Ltd., Tokyo,
Japan, a corporation of Japan
No Drawing. Filed May 29, 1964, Ser. No. 371,182
Claims priority, application Japan, May 31, 1963,
38/28,436; June 12, 1963, 38/31,510
7 Claims. (Cl. 260—47)

ABSTRACT OF THE DISCLOSURE

A process for producing a fiber-forming modified polyester which comprises reacting terephthalic acid or its dimethyl ester, ethylene glycol and a compound having an epoxy group in the molecule and represented by the formula:

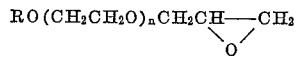

wherein R is an alkyl group having 1 to 18 carbon atoms, an aryl group, or an alkylaryl group and $n$ is an integer of from 1 to 10, as a third component, alone or together with a compound having at least two epoxy groups in the molecule, in the same manner as in the production of unmodified polyesters. The resulting modified polyester has mechanical properties substantially the same as those of the unmodified polyester (polyethylene terephthalate) and can be formed into fibers or films having much superior dyeability with a disperse dyestuff.

---

This invention relates to a modified polyester. More particularly, the invention pertains to a process for producing a novel modified copolyester possessing excellent mechanical properties of polyesters and, in addition, having a prominent dyeability.

The novel modified polyester obtained in accordance with the present invention is highly suitable for the production of fibers, films as well as other shaped articles.

Polyesters prepared from terephthalic acid or its lower aliphatic alkyl esters and glycols such as ethylene glycol can be shaped into fibers, films, and other shaped articles, excellent in mechanical properties, weathering and thermal resistance, and hence are highly evaluated. They, however, suffer from such drawback as being poor in dyeability.

As methods for dyeing polyester synthetic fibers, for example, a carrier dyeing process effected in the presence of a suitable swelling agent, and a high temperature dyeing process carried out under pressure at high temperature of above 100° C. have ordinarily been adopted. The adoption of these processes, however, cannot be said as being desirable from the industrial point of view, because the processes are not only troublesome in dyeing step but are economically disadvantageous.

In order to improve the dyeability of polyester synthetic fibers, there have recently been attempted to adopt modification processes carried out by preparing copolyester in the presence of a third component; by varying stretching conditions in the production of fibers; and by subjecting the fibers to after-treatment.

Among the above, the most noticeable process is the modification according to copolymerization. The fundamental idea of this process is to improve the dyeability by adding one or more third components as polymerization components other than terephthalic acid and ethylene glycol, thereby lowering the crystallinity of the resulting polyester. Third components which have frequently been employed include a dibasic acid substitutable with a part of terephthalic acid, and a dihydroxy compound substitutable with a part of ethylene glycol.

Further, for the purpose of improving the dyeability particularly for basic or acidic dyes, there has also been known the copolymerization of a compound containing metal sulfonate, metal sulfinate, metal carboxylate or sulfonamide, as a third component.

Actually, however, none of the above processes has given satisfactory results.

An object of the present invention is to provide a process for producing a novel polyester so modified as to have an excellent ability for being shaped into fibers, films and other shaped articles, to be dyed with extreme ease when shaped into fibers, films and other shaped articles, to be excellent in color value, and to be favorable in dye fastness.

Another object of the invention is to provide a process for producing a novel polyester so modified as to be improved in processability into various products, and to be favorable particularly in mechanical properties when shaped into fibers, films, and other shaped articles.

The gist of the present invention resides in a process for preparing from at least one aromatic dibasic acid or its lower alkyl ester and at least one glycol, a novel modified polyester suitable for the production of fibers, films and other shaped articles, characterized by adding to the above components at least one compound containing one epoxy group in a molecule and having the general formula

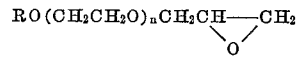

wherein R is one member selected from the group consisting of a $C_1$–$C_{18}$ alkyl, aryl, and alkylaryl group, and $n$ is an integer selected from 1 to 10, said compound being used alone or in combination with an epoxy compound having two or more epoxy groups in a molecule, heating and reacting the above components and continuing the heating until a desired polymerization degree is attained.

Polyesters which are the substrates to be modified in accordance with the present invention are obtained by reaction of one or more known aromatic dibasic acids such as terephthalic and isophthalic acids or lower alkyl esters thereof with one or more aliphatic glycol represented by the formula $HO(CH_2)_nOH$, wherein $n$ is an integer of 2 to 10 or alicyclic glycols such as 1,4-cyclohexane dimethanol.

In practicing the present invention, lead acetate, cobaltous acetate, zinc acetate, manganous acetate, calcium acetate, antimony trioxide, antimony triacetate, cadmium oxide or lithium oxalate which has conventionally been used as a catalyst for polyester production is employed alone or in admixture in the ester interchange reaction, reaction of the modifier and polycondensation, respectively. Further, color inhibitors or stabilizers such as phosphoric and phosphorous acid or their esters and a delustering agent such as titanium dioxide may be added.

The ester interchange reaction and the reaction of the modifier represented by the aforesaid general formula are effected desirably under nitrogen atmosphere at temperatures of 100°–280° C., preferably 150°–250° C., and the polycondensation reaction is carried out in high vacuum of below 10 mm. Hg at temperatures in the range of 200°–350° C., preferably 250°–330° C., until a desired high polymerization degree is attained.

The modifiers to be used in the present invention, i.e. the compounds represented by the general formula $$RO(CH_2CH_2O)_nCH_2CH\underset{O}{\overset{}{\diagdown\diagup}}CH_2$$

wherein R is one member selected from the group consisting of a $C_1$–$C_{18}$ alkyl, aryl, and alkylaryl group, and $n$ is an integer selected from 1–10, are readily synthesized according to conventional process from corresponding monohydroxy compounds and epichlorohydrin. Such modifiers include, for example, the following compounds:

(1) $CH_3O\ CH_2CH_2O\ CH_2CH\underset{O}{\overset{}{\diagdown\diagup}}CH_2$ 1-($\beta,\gamma$-epoxypropoxy)-2-methoxyethane (2) $C_2H_5O\ CH_2CH_2O\ CH_2CH\underset{O}{\overset{}{\diagdown\diagup}}CH_2$ 1-($\beta,\gamma$-epoxypropoxy)-2-ethoxyethane (3) $C_4H_9O\ CH_2CH_2O\ CH_2CH\underset{O}{\overset{}{\diagdown\diagup}}CH_2$ 1-($\beta,\gamma$-epoxypropoxy)-2-butoxyethane (4) 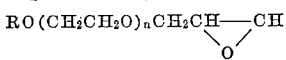—$O\ CH_2CH_2O\ CH_2CH\underset{O}{\overset{}{\diagdown\diagup}}CH_2$ 1-($\beta,\gamma$-epoxypropoxy)-2-phenoxyethane (5) ⟨phenyl⟩—$CH_2OCH_2CH_2O\ CH_2CH\underset{O}{\overset{}{\diagdown\diagup}}CH_2$ 1-($\beta,\gamma$-epoxypropoxy)-2-benzyloxyethane (6) $CH_3O\ CH_2CH_2O\ CH_2CH_2O\ CH_2CH\underset{O}{\overset{}{\diagdown\diagup}}CH_2$ 1-($\beta,\gamma$-epoxypropoxy)-2-methoxyethoxyethane (7) $C_2H_5OCH_2CH_2O\ CH_2CH_2O\ CH_2CH\underset{O}{\overset{}{\diagdown\diagup}}CH_2$ 1-($\beta,\gamma$-epoxypropoxy)-2-ethoxyethoxyethane (8) $C_4H_9OCH_2CH_2O\ CH_2CH_2O\ CH_2CH\underset{O}{\overset{}{\diagdown\diagup}}CH_2$ 1-($\beta,\gamma$-epoxypropoxy)-2-butoxyethoxyethane (9) ⟨phenyl⟩—$O\ CH_2CH_2O\ CH_2CH_2O\ CH_2CH\underset{O}{\overset{}{\diagdown\diagup}}CH_2$ 1-($\beta,\gamma$-epoxypropoxy)-2-phenoxyethoxyethane

(10) ⟨phenyl⟩—$CH_2O\ CH_2CH_2O\ CH_2CH_2O\ CH_2CH\underset{O}{\overset{}{\diagdown\diagup}}CH_2$ 1-($\beta,\gamma$-epoxypropoxy)-2-benzyloxyethoxyethane

(11) $C_4H_9O\ CH_2CH_2O\ CH_2CH_2O\ CH_2CH_2O\ CH_2CH\underset{O}{\overset{}{\diagdown\diagup}}CH_2$ 1-($\beta,\gamma$-epoxypropoxy)-2-butoxyethoxyethxoyethane

(12) ⟨phenyl⟩—$OCH_2CH_2O\ CH_2CH_2O\ CH_2CH_2O\ CH_2CH\underset{O}{\overset{}{\diagdown\diagup}}CH_2$ 1-($\beta,\gamma$-epoxypropoxy)-2-phenoxyethoxyethoxyethane These modifiers may be used alone or in admixture. The amount of modifier to be added is within the range of 1–35 mol percent based on the acid component, employed in polyester production, composed mainly of aromatic dibasic acid or its lower limit, the main object of dyeability improvement is not achieved, whereas in case the amount is larger than the upper limit, no polyester having an ability of forming fibers or the like is obtainable. The preferable range of the amount of modifier to be added is in the range of 2–15 mol percent based on the acid component.

The time of addition of the modifier is desirably at the initial stage of the preparation of polyester, the substrate. That is, the modifier is preferred to be mixed with acid and glycol components before the heating and reaction of the components. However, it may be added after the ester interchange reaction of the acid and glycol components, and before the polycondensation.

The present modified polyester thus obtained is lowered in melting point and second order transition temperature within practically permissible ranges and is improved in processability in shaping into fibers, films and other shaped articles. When shaped into fibers and films, it is possible to expect an improvement in dyeability for dispersed dyes by virtue of the lowering in crystallinity.

Namely, in the case of fibers and films produced from the modified polyesters obtained in accordance with the process of the present invention, hydrophilic ether linkages are introduced into the polyester molecules, whereby the area of non-crystalline part becomes larger and the molecules of penetrated water swell the fibers to facilitate the diffusion of dye molecules into the interior of fibers. Further, the oxyethylene group of the monoepoxy compound represented by the aforesaid general formula acts as a dye-site. Thus, the polyester fibers become high in affinity for dyes, have an excellent rate of dyeing, and show favorable color value as compared with conventional polyester fibers. Further, the fibers obtained from the modified polyesters of the present invention are high in moisture absorption, show good pills resistance and have unique hand.

The present polyesters are about the same in mechanical properties as conventional polyesters and hence can be formed into excellent fibers, films and other shaped articles.

Furthermore, the present invention involves the case where a compound, containing one epoxy group in a molecule, represented by the general formula $$RO(CH_2CH_2O)_nCH_2CH\underset{O}{\overset{}{\diagdown\diagup}}CH_2$$

wherein R is one member selected from the group consisting of a $C_1$–$C_{18}$ alkyl, aryl or alkylaryl group, and $n$ is an integer selected from 1 to 10, is used in combination with an epoxy compound having 2 or more epoxy groups in a molecule. In this case, there is formed a copolymerized, cross-linked or branched polyester excellent in dyeability which has the prominent mechanical properties inherent to polyesters.

The epoxy compound employed contains 2 or more epoxy groups in a molecule and is relatively high in boiling point, so that it is stable in the ester interchange reaction as well as in the polycondensation reaction and is scarcely removed out of the system under vacuum.

The epoxy compound having two or more epoxy groups includes the following:

(1) $CH_2\underset{O}{\overset{}{\diagdown\diagup}}CHCH_2OCH_2CH\underset{O}{\overset{}{\diagdown\diagup}}CH_2$ Bis-($\beta,\gamma$-epoxypropyl)-ether (2) $CH_2\underset{O}{\overset{}{\diagdown\diagup}}CHCH_2OCH_2CH_2OCH_2CH\underset{O}{\overset{}{\diagdown\diagup}}CH_2$ 1,2-bis($\beta,\gamma$-epoxypropoxy)-ethane (3) $CH_2\underset{O}{\overset{}{\diagdown\diagup}}CHCH_2OCH_2CH_2CH_2O\ CH_2CH\underset{O}{\overset{}{\diagdown\diagup}}CH_2$ 1,3-bis($\beta,\gamma$-epoxypropoxy)-propane (4) $CH_2\underset{O}{\overset{}{\diagdown\diagup}}CHCH_2O\ CH_2CH_2CH_2CH_2O\ CH_2CH\underset{O}{\overset{}{\diagdown\diagup}}CH_2$ 1,4-bis($\beta,\gamma$-epoxypropoxy)-butane (5) $CH_2\underset{O}{\overset{}{\diagdown\diagup}}C_6H_{12}CH\underset{O}{\overset{}{\diagdown\diagup}}CH_2$ 1,6-bis(epoxyethyl)-hexane (6) $CH_2\underset{O}{\overset{}{\diagdown\diagup}}CHCH_2OCH_2\underset{OH}{\overset{}{CH}}CH_2OCH_2CH\underset{O}{\overset{}{\diagdown\diagup}}CH_2$ 2-hydroxy-1,3-bis($\beta,\gamma$-epoxypropoxy)-propane (7) $CH_2\underset{O}{\overset{}{\diagdown\diagup}}\underset{CH_3}{\overset{CH_3}{C}}CH_2O\ CH_2CH_2O\ CH_2\underset{CH_3}{\overset{CH_3}{C}}\underset{O}{\overset{}{\diagdown\diagup}}CH_2$ 1,2-bis($\beta$-methyl-$\beta,\gamma$-epoxpropoxy)-ethane

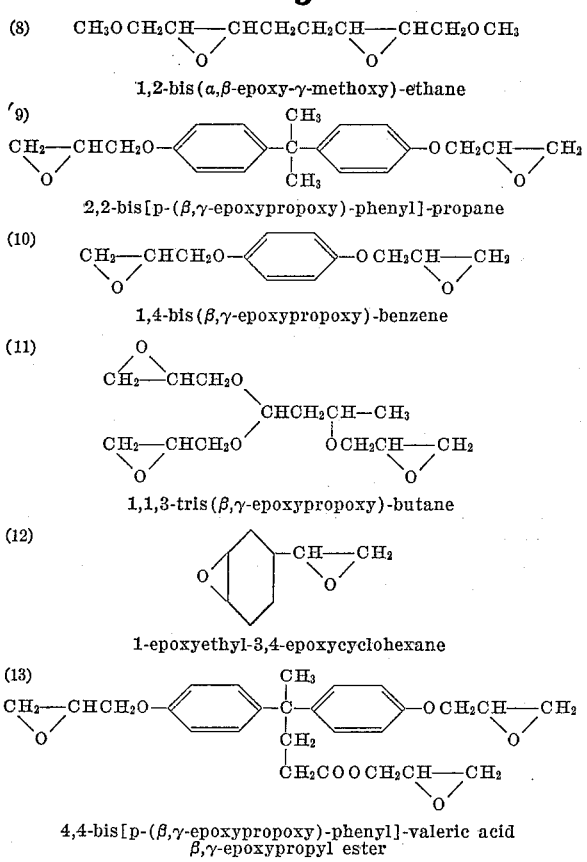

(8) CH₃OCH₂CH——CHCH₂CH₂CH——CHCH₂OCH₃
         \O/           \O/

1,2-bis(α,β-epoxy-γ-methoxy)-ethane (9) 2,2-bis[p-(β,γ-epoxypropoxy)-phenyl]-propane

(10) 1,4-bis(β,γ-epoxypropoxy)-benzene

(11) 1,1,3-tris(β,γ-epoxypropoxy)-butane

(12) 1-epoxyethyl-3,4-epoxycyclohexane

(13) 4,4-bis[p-(β,γ-epoxypropoxy)-phenyl]-valeric acid β,γ-epoxypropyl ester

When one or more of the above epoxy compounds containing 2 or more epoxy groups in a molecule are used in combination with the compound represented by the aforesaid general formula which contains one epoxy group in a molecule, the resulting polyester is cross-linked or branched, whereby it is possible to produce a co-polymerized, cross-linked or branched polyester of a high polymerization degree in a short polycondensation time as compared with a polyester prepared without the addition of the epoxy compound having two or more epoxy groups.

In case the amount of the epoxy compound having two or more epoxy groups added is increased, the resulting polyester is increased in molecular weight, cross-linking and melt viscosity, until at last there is formed an insoluble and infusible polyester, which when shaped into fibers or the like is lowered in stretchability of unstretched filaments as well as in ability for forming fibers or the like. According to the increase in the number of functional groups in the epoxy compound, the amount of the compound to be added to attain a desired molecular weight may be decreased. Therefore, there is a definite suitable amount for the epoxy compound having two or more epoxy groups to be added which is in the range of 0.001–1 mol percent, preferably 0.01–0.5 mol percent, based on the acid component employed for the production of polyester. The time of addition of aforesaid epoxy compound may be either stage in ester interchange reaction or polycondensation reaction step for the production steps of polyester. It is however desirable to mix the compound previously with the acid and glycol components, followed by heating under ester interchange reaction and polycondensation condition, because the effect of cross-linking becomes favorable and the polycondensation time is shortened.

When shaped into fibers or the like, the present co-polymerized, cross-linked or branched polyesters thus obtained are expected, by virtue of lowered crystallinity, to be improved in rate of dyeing for dispersed dyes. Further, the oxyethylene group of the monoepoxy compound represented by the aforesaid general formula acts as a dye-site and hence it is possible to bring dye about the increase in equilibrium degree of exhaustion. On the other hand, the combination use of the epoxy compound having two or more epoxy groups is markedly effective in that a polyester of a desired polymerization degree is obtained in a short period and the monoepoxy compound represented by the aforesaid general formula is prevented from undesirable decomposition owing to exposure to elevated temperatures for a long period in the reaction system.

In accordance with the present invention, all the above-mentioned effects are united to make it possible to obtain fibers, films and other shaped articles markedly excellent in dyeability and having substantially the same mechanical properties as those of conventional polyesters.

The modified polyesters of the present invention may sufficiently be formed into fibers or films and other shaped articles according to either conventional process, without requiring any particular technique. Briefly, the operations may be carried out by first heating the polyester and then subjecting the heated polyester to a suitable combination of melt extrusion, stretching and heat treatment.

In order to assist understanding of the present invention, the following examples are given, but they are only illustrative and the invention is not limited thereto. In the examples, all the parts are by weight; "$\eta_{sp./c.}$" shows a value measured for solutions of these polymers in 0.5 g./100 cc. phenol-tetrachloroethane (50:50) at 20° C. and "$T_g$" represents a second order transition temperature and is a value measured according to differential thermal analysis.

*Example 1*

100 parts of dimethyl terephthalate and 72.3 parts of ethylene glycol were thoroughly mixed with 4.3 parts of a modifier of 1-(β,γ-epoxypropoxy)-2-butoxyethane and each 0.05 part of catalysts of antimony trioxide and zinc acetate. The mixture was heated to 180° C. for 4 hrs. and was subjected to ester interchange reaction and the reaction of said modifier, while introducing nitrogen slowly. Subsequently the temperature was elevated to 220° C. After the elapse of about 20 minutes, the temperature was gradually raised and the pressure was reduced, and the mixture was polymerized at 275° C. for 4 hrs. under a vacuum of below 1 mm. Hg. The resulting polymer was nearly white and had a melting point of 252° C., $T_g$ of 62°–68° C. and $\eta_{sp./c.}$ of 0.678. The polymer was subjected to melt-spinning according to conventional process to obtain filaments having a denier of 2.99, a dry strength of 5.90 g./d., a dry elongation of 17.2% and a knot strength of 4.98 g./d. The fiber could be deeply dyed when subjected at 98° C. for 90 minutes to a dye bath comprising 2% (based on the fibers) of the dispersed dye "Eastman Polyester Red B," 4% (based on the fibers) of the dispersing agent "Disper HTD" (a product of Meisei Kagaku Co., Ltd., Japan) and 0.4 cc./l. of acetic acid, at a bath ratio (weight of bath/weight of fiber) of 50.

For comparison, polyethylene terepthalate was prepared under the same conditions as above without the addition of said modifier. The product had a melting point of 260° C. and $T_g$ of 60°–70° C., and was merely dyed into light color. Thus, the effect of the modifier was evident.

*Example 2*

100 parts of dimethyl terephthalate, 71.6 parts of ethylene glycol, 8.7 parts of 1-(β,γ-epoxypropoxy)-2-isopropoxyethane, 0.1 part of lithium oxalate and 0.1 part of zinc acetate were thoroughly mixed and the mixture was subjected to the same operations as in Example 1 to obtain a white polymer having a melting point of 245° C., $T_g$ of 56°–64° C. and $\eta_{sp./c.}$ of 0.556. A fiber obtained by melt-spinning the above polymer was dyed at 98° C. for 90 minutes in a dye bath, at a bath ratio of 50, comprising 2% (based on the fibers) of the dispersed dye "Eastman Polyester Blue BLF," 4% (based on the fibers) of the dispersing agent "Disper IS" (a product of Meisei Kagaku Co., Ltd., Japan). The fiber showed a dye exhaustion of 82.5% and was confirmed to be excellent in dyeability for dispersed dyes as compared with an unmodified polyethylene terephthalate which showed a dye-exhaustion of 48–50%.

Example 3

100 parts of dimethyl terephthalate, 70.0 parts of ethylene glycol, 8.7 parts of 1-($\beta$,$\gamma$-epoxypropoxy)-2-butoxyethane, 0.04 part of antimony trioxide and 0.15 part of calcium acetate were thoroughly mixed and the mixture was subjected to the same operations as in Example 1 to obtain a white polymer having a melting point of 253° C. and $\eta_{sp./c.}$ of 0.532. A fiber obtained from the polymer was dyed with a dispersed dye as in Example 2 to confirm that the dyeability of the fiber was markedly improved.

Example 4

100 parts of dimethyl terephthalate, 92.2 parts of ethylene glycol, 21.3 parts of 1-($\beta$,$\gamma$-epoxypropoxy)-2-butoxy ethane, and each 0.1 part of lithium oxalate and zinc acetate were thoroughly mixed and the mixture was subjected to the same operations as in Example 1 to obtain a white to light yellow polymer. The polymer had a melting point of 236° C. and $\eta_{sp./c.}$ of 0.496, and was confirmed to be greatly improved in dyeability for dispersed dyes.

Example 5

100 parts of dimethyl terephthalate, 81.7 parts of ethylene glycol, 7.5 parts of 1-($\beta$,$\gamma$-epoxypropoxy)-2-methoxyethane and each 0.05 part of antimony trioxide and zinc acetate were thoroughly mixed and the mixture was subjected to the same operations as in Example 1 to obtain a polymer having a melting point of 252° C. and $\eta_{sp./c.}$ of 0.638. It was confirmed that a fiber obtained from the polymer was markedly improved in dyeability for dispersed dyes.

Example 6

100 parts of dimethyl terephthalate, 73.7 parts of ethylene glycol, 5.6 parts of 1-($\beta$,$\gamma$-epoxypropoxy)-2-butoxyethane, 0.04 part of zinc oxide and 0.03 part of zinc acetate were thoroughly mixed and the mixture was subjected to the same operations as in Example 1 to obtain a white polymer having a melting point of 255° C. and $\eta_{sp./c.}$ of 0.573. The polymer was excellent in dyeability for dispersed dyes.

Example 7

Into a reaction tube were charged, respectively, 100 parts of dimethyl terephthalate, 72 parts of ethylene glycol, 0.2 part of zinc acetate, 0.2 part of lithium oxalate and each of (A) 4.5 parts of 1-($\beta$,$\gamma$-epoxypropoxy)-2-butoxyethane and 0.208 part of 1,4-bis($\beta$,$\gamma$-epoxypropoxy) butane,
(B) 9.0 parts of 1-($\beta$,$\gamma$-epoxypropoxy)-2-butoxyethane and 0.208 part of 1,4-bis($\beta$,$\gamma$-epoxypropoxy) butane,
(C) 4.5 parts of 1-($\beta$,$\gamma$-epoxypropoxy)-2-butoxyethane, and
(D) 9.0 parts of 1-($\beta$,$\gamma$-epoxypropoxy)-2-butoxyethane.

Each mixture was heated, while being stirred, and the ester interchange was effected at 210° C. and was completed in about 120 minutes. Thereafter, each reaction tube was gradually evacuated and the reactants were then polymerized at 275° C. for 240 minutes. The resulting polymers had $\eta_{sp./c.}$ and melting points as shown in the following table:

| Modifier | $\eta_{sp./c.}$ | Melting point, ° C. |
|---|---|---|
| (A) | 0.685 | 252 |
| (B) | 0.706 | 244 |
| (C) | 0.426 | 252 |
| (D) | 0.524 | 244 |

It was confirmed that, collectively, the cases of (A) and (B) are more excellent than the cases of (C) and (D).

The polymers obtained by use of (A) and (B) were melt-spun according to conventional process and the resulting fibers were respectively dyed at 98° C. for 90 minutes in a dye bath, at a bath ratio of 50, comprising 2% (based on the fibers) of the dispersed dye "Eastman Polyester Blue BLF" and 4% (based on the fibers) of the dispersing agent "Disper IS." The dye exhaustion of the fiber in the case of (A) was 76.9% and that of the fiber in the case of (B) was 81.2%. Thus, both fibers were markedly excellent in dyeability.

The properties of these fibers were measured to obtain the values as set forth in the following table, and it was confirmed that the fibers can be sufficiently put into practical use:

| Samples | Properties | | | |
|---|---|---|---|---|
| | Denier | Dry strength (g./d.) | Dry elongation (percent) | Dry knot strength (g./d.) |
| (A) | 2.21 | 5.00 | 19.9 | 4.35 |
| (B) | 3.21 | 4.29 | 21.7 | 3.75 |

Example 8

In place of 1-($\beta$,$\gamma$-epoxypropoxy)-2-butoxyethane in the compositions (A) and (B) employed in Example 7, 3.87 parts (E) and 7.75 parts (F) of 1-($\beta$,$\gamma$-epoxypropoxy)-2-phenoxyethane were employed, respectively. Respective mixtures were subjected to polycondensation in vacuum at 275° C. for about 240 minutes to obtain polyesters having the following $\eta_{sp./c.}$ and melting points:

| Samples | $\eta_{sp./c.}$ | Melting point, ° C. |
|---|---|---|
| (E) | 0.612 | 248 |
| (F) | 0.648 | 241 |

From the polymers thus obtained, chips were formed and were melt-spun according to conventional process to obtain fibers. Respective fibers were dyed into deep color when dyed as in Example 7.

Example 9

The same operations as in Example 7 were repeated, except that 7.06 parts of 1-($\beta$,$\gamma$-epoxypropoxy)-2-butoxyethane and 0.25 part of 2-hydroxy-1,3-bis($\beta$,$\gamma$-epoxypropoxy)-propane were used, to obtain a modified polyester having $\eta_{sp./c.}$ of 0.714 and a melting point of 245° C.

Example 10

1,000 parts of dimethyl terephthalate, 710 parts of ethylene glycol, 0.3 part of managanous acetate, 0.3 part of antimony trioxide and 89.8 parts of 1-($\beta$,$\gamma$-epoxypropoxy)-2-butoxyethane were charged in a stainless steel reactor provided with a rectifier and were heated under agitation at 190° C. for 3.5 hours. After the distillation of a theoretical amount of methanol, 0.75 part of phosphoric acid was added and the mixture was heated for additional 20 minutes. The resulting precondensate was transferred into an autoclave and was heated at 250° C. under atmospheric pressure for 30 minutes, under 250 mm. Hg for 30 minutes and under 15 mm. Hg for 10 minutes. Subsequently, the condensate was subjected to polycondensation at 270° C. under a high vacuum of 0.4 mm. Hg for 5 hours to obtain a white polymer having a melting point of 244°–247° C. and $\eta_{sp./c.}$ of 0.85. The polymer thus obtained was melted in an extruder at 280° C., extruded through a spinneret with 6 holes and the resulting filaments were wound at a speed of 600 m./min. The thus obtained unstretched filaments were stretched to 4.6 times and thermally treated at 140° C. to obtain a tough fiber having a dry strength of 4.4 g./d. and a dry elongation of 33%. The fiber was subjected to dyeing at boil (98° C.) for 90 minutes in a dye bath, at a bath ratio of 100, comprising 2% (based on the fibers) of the dispersed dye "Eastman Polyester Blue BLF," 4% (based on the fibers) of the dispersing agent "Disper-HTD" and 0.4 cc./l. of acetic acid, whereby the fiber was dyed into a deep color and showed a dye exhaustion of 78.0%. For comparison, an unmodified polyethylene terephthalate was prepared under the same conditions as above which was dyed into a light to medium color and showed a dye exhaustion of 54.5%.

*Example 11*

In place of 89.8 parts of the 1-($\beta$,$\gamma$-epoxypropoxy)-2-butoxyethane employed in Example 10, 67.6 parts of 1-($\beta$,$\gamma$-epoxypropoxy)-2-butoxyethoxyethane were used and the mixture was subjected to polycondensation in vacuum at 273° C. for about 4.0 hours to obtain a light yellow polymer. The polymer had a melting point of 251°–254° C. and $\eta_{sp./c.}$ of 0.79. When dyed with 2% (based on the fibers) of the dispersed dye "Eastman Polyester Yellow 3 GL," the fiber was dyed into a deep color and showed a dye exhaustion of 57.5%. For comparison an unmodified polyethylene terephthalate was prepared under the same conditions as above which was dyed into a light color and showed a dye exhaustion of not more than 22.5%.

*Example 12*

1,000 parts of dimethyl terephthalate, 750 parts of ethylene glycol, 0.5 part of zinc acetate, 75 parts of 1-($\beta$,$\gamma$-epoxypropoxy)-2-phenoxyethane, and 1.0 part of 1,4-bis($\beta$,$\gamma$-epoxypropoxy)-butane were charged in an ester interchange reactor and were heated, under agitation, at 200° C. for 2.5 hours and at 215° C. for 0.5 hour to distill methanol. Subsequently, 1.0 part of triphenyl phosphite was added and the mixture was heated for 30 minutes. Then, 0.5 part of antimony triacetate was further added and the heating was continued for additional 30 minutes. The temperature was then elevated to 250° C. and the mixture was maintained at said temperature for 40 minutes under vacuum and is thereafter reacted at 270° C. for 3.0 hours under a vacuum of 0.7 mm. Hg to obtain a white polymer having a melting point of 250°–254° C. and $\eta_{sp./c.}$=0.95. The polymer was subjected to spinning, after-treatment and was dyed at boil with 2% (based on the fibers) of the dispersed dye "Eastman Polyester Red B," whereby the fiber was dyed into a deep color and showed a dye exhaustion of 74.3%. For comparison, an unmodified polyethylene terephthlate was prepared under the same conditions as above which was dyed into a light color and showed a dye exhaustion of not more than 19.0%.

What we claim is:

1. A process for producing fiber-forming modified polyesters which comprises mixing together (1) at least one compound selected from the group consisting of terephthalic acid and its dimethyl ester, and (2) ethylene glycol with (3) a compound containing one epoxy group in the molecule and having the formula

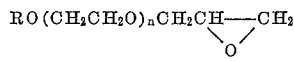

wherein R is a member selected from the group consisting of alkyl groups having 1 to 18 carbon atoms, aryl groups and alkylaryl groups, and $n$ is an integer of 1 to 10, and heating the resulting mixture at a temperature of from 100° to 350° C., to react the mixture until a fiber-forming modified polyester is produced.

2. A process according to claim 1, wherein the compound (3) containing one epoxy group in the molecule is used in an amount of 1 to 35 mol percent based on the weight of the acid component present in the reaction mixture.

3. A process according to claim 1, wherein the compound (3) containing one epoxy group in the molecule is selected from the group consisting of 1-($\beta$,$\gamma$-epoxypropoxy) - 2 - butoxyethane, 1-($\beta$,$\gamma$-epoxypropoxy)-2-butoxyethoxyethane, 1 - ($\beta$,$\gamma$-epoxypropoxy)-2-phenoxyethane and 1 - ($\beta$,$\gamma$ - epoxypropoxy)-2-phenoxyethoxyethane.

4. A process according to claim 1, wherein the compound (3) containing one epoxy group in the molecule is used in combination with a compound (4) selected from the group consisting of 1,3-bis($\beta$,$\gamma$-epoxypropoxy)-propane and 1,4-bis($\beta$,$\gamma$-epoxypropoxy)-butane.

5. A process according to claim 4, wherein the compound (4) is used in an amount of 0.001 to 1 mol percent based on the weight of the acid component present in the reaction mixture.

6. A process according to claim 4, wherein the compound (3) containing one epoxy group in the molecule is selected from the group consisting of 1-($\beta$,$\gamma$-epoxypropoxy) - 2 - butoxyethane, 1-($\beta$,$\gamma$-epoxypropoxy)-2-butoxyethoxyethane, 1 - ($\beta$,$\gamma$ - epoxypropoxy)-2-phenoxyethane and 1 - ($\beta$,$\gamma$ - epoxypropoxy)-2-phenoxyethoxyethane.

7. A process for producing fiber-forming modified polyesters, which comprises mixing together dimethyl terephthalate and ethylene glycol with from 2 to 15 mol percent, based on the weight of the dimethyl terephthalate, of one member selected from the group consisting of 1-($\beta$,$\gamma$ - epoxypropoxy)-2-butoxyethane, 1-($\beta$,$\gamma$-epoxypropoxy) - 2-butoxyethoxyethane, 1-($\beta$,$\gamma$-epoxypropoxy)-2-phenoxyethane and 1-($\beta$,$\gamma$ - epoxypropoxy)-2-phenoxyethoxyethane, and heating the resulting mixture at a temperature of from 150° to 330° C. to react the mixture until a fiber-forming modified polyester is produced.

References Cited

UNITED STATES PATENTS 3,089,863  3/1963  Hicks.

WILLIAM H. SHORT, *Primary Examiner.*

R. T. LYON, *Assistant Examiner.*